United States Patent
Tanaka et al.

[11] Patent Number: 5,853,240
[45] Date of Patent: Dec. 29, 1998

[54] PROJECTOR USING A SMALL-SIZE OPTICAL SYSTEM

[75] Inventors: Seiichi Tanaka; Atsushi Yamanaka, both of Chiba, Japan

[73] Assignee: Sharp Kabushiki Kaisha, Osaka, Japan

[21] Appl. No.: 770,052

[22] Filed: Dec. 19, 1996

[30] Foreign Application Priority Data

Dec. 22, 1995 [JP] Japan ................................. 7-335447

[51] Int. Cl.[6] ................................................. G03B 21/14
[52] U.S. Cl. ........................... 353/20; 353/98; 353/69; 359/631; 349/8
[58] Field of Search ................................. 353/20, 69, 98, 353/7, 8; 349/5, 7, 8, 9, 11, 15, 62, 98, 96, 115; 359/630, 636, 637, 639, 464, 465

[56] References Cited

U.S. PATENT DOCUMENTS

| | | | |
|---|---|---|---|
| 5,050,966 | 9/1991 | Berman | 349/11 |
| 5,408,346 | 4/1995 | Trissel | 349/115 |
| 5,573,324 | 11/1996 | DeVaan | 353/98 |
| 5,601,351 | 2/1997 | van der Brandt | 353/20 |
| 5,626,408 | 5/1997 | Heynderickx et al. | 353/20 |

FOREIGN PATENT DOCUMENTS

| | | | |
|---|---|---|---|
| 0302619 | 2/1989 | European Pat. Off. | 349/115 |
| 6-153121 | 5/1994 | Japan . | |

Primary Examiner—William Dowling

[57] ABSTRACT

A small and light liquid-crystal projector, a projector making a combination with a head-mounted display and a small-and-light projector device for projecting an image or three-dimensional image from the HMD onto a common screen: the HMD has, in its casing, an optical device for enlarging an image of a liquid-crystal panel illuminated by a back light, which device comprising a reflection type refracting element with a half-mirror coat and a cholesteric liquid crystal element acting as circularly-polarized-light selecting semitransparent mirror; a base unit with which the HMD is connected to form a projector device has, in its housing, an optical correcting portion, a projector back-light, a light-source changing portion and a mechanism for inserting the optical correcting portion for correcting the curvature of a projectable image; when assembling the HMD with the base unit, the light-source changing portion acts so as to illuminate the liquid crystal panel with intensive back-light though a parabolic mirror and, at the same time, the optical correcting portion is inserted into a optical path.

5 Claims, 20 Drawing Sheets

FIG.16 (A)
FIG.16 (B)
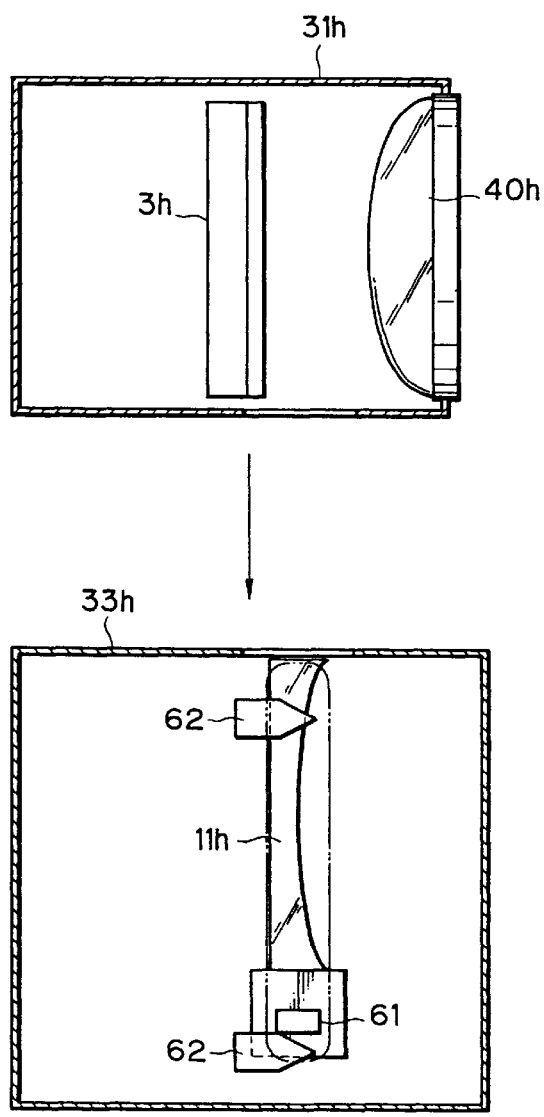
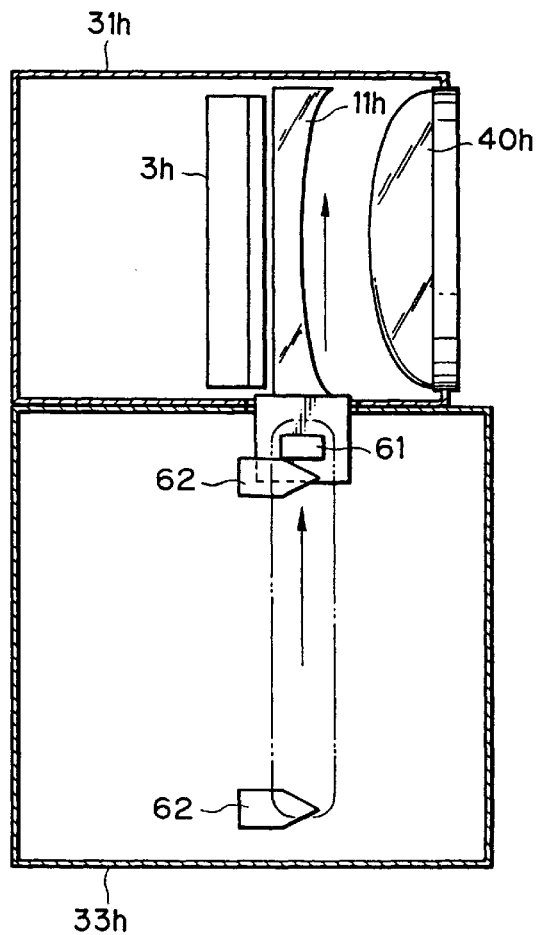

PROJECTOR USING A SMALL-SIZE OPTICAL SYSTEM

BACKGROUND OF THE INVENTION

An increasing demand for video-viewing pleasure with a large-screen has advanced the development of large-screen image-display devices.

Particularly, liquid crystal projectors have achieved a remarkable advance in development because they can easily realize a large-screen display.

A conventional liquid-crystal projector is composed mainly of a light-source, a reflecting plate, a liquid-crystal panel, a projecting lens and a screen.

Light from the light source is reflected by the reflecting plate to form parallel beams of the source light, which then fall onto the liquid crystal panel. The parallel light beams enter the liquid crystal panel and become image carrying light that is then projected onto the screen by the projecting lens.

To reduce the size of the device and enlarge the screen image, it is most important to increase the power of the projecting lens in the above-mentioned liquid-crystal projector. Prior arts have adopted a combination of lenses as a projector lens to increase the optical power. This solution, however, encounters a problem that the use of the combination lens increases the size of the projector lens itself, resulting in increasing the size of a whole system of the projector.

The present applicant has also proposed an optical system with a reduced in size combination lens, an example of which is composed mainly of a lens and a semi-transparent mirror for selecting circularly polarized light. The lens has a half-mirror coat covering one surface and the semi-transparent mirror for selecting circularly polarized mirror is disposed on the side of non-coated surface of the lens.

The circularly polarized light selecting semitransparent mirror is an optical component that varies its reflection and transmission characteristics depending upon the polarization direction of circularly polarized light. In this example, the semitransparent selecting mirror reflects clockwise circularly polarized light and transmits counterclockwise circularly polarized light. The half-mirror coat applied to the convex surface of the lens reflects 50% of incident light being clockwise circularly polarized and transmits the rest (50% of the incident light).

The reflected light is not used and the transmitted light is refracted at the convex surface of the lens and going in the lens. The refraction can not change the direction of the circular polarization of the light. So, the light as clockwise circularly polarized passes the plane surface of the lens and arrives at the circularly-polarized-light selecting semitransparent mirror which in turn reflects clockwise circularly polarized light as it is. The reflected light reaches again the convex surface of the lens where the half-mirror coat reflects 50% of the light and transmits 50% of the light. The light transmitted through the half-mirror is not used. The reflected light has a changed direction of the circular polarization, i.e., becomes counterclockwise circularly polarized light. It passes the plane surface of the lens and the semitransparent selecting mirror and goes out of the optical system.

In comparison with a conventional optical apparatus containing a plurality of lenses for increasing the optical power, this optical device can obtain the same optical power at a shorter optical length reduced to about ⅕, thereby the optical device may have a reduced size and weight. Application of the optical device to projecting optics may realize a small-sized projector with large screen.

The above-mentioned optical device has also been proposed to use as an enlarging optical system in a head mounted display (hereinafter abbreviated as HMD).

A HMD is a spectacle type case containing a whole system for realizing enlarged-screen viewing pleasure, which is mounted on the head of a user.

The HMD has two eye-portions each containing a set of a back-light, a liquid crystal panel and an enlarging optical system, which are arranged in turn from the outside of the case. A user with the HMD can view an enlarged screen image through the eye portions.

The HMD, however, involves the following problems:

The HMD can be used by one user only and can not be observed by other persons at a time. Concerning this problem, Japanese Laid-Open Patent Publication No. 6-153121 discloses such a device that combines a HMD with a projector to project an image on a screen to be seen by plurality of persons. This device is composed mainly of an LCD (Liquid Crystal Display), a group of enlarging lenses of the HMD and a group of projecting lens.

These lens sets, of course, require the use of conventional combination lens system for increasing the optical power. Consequently, the device provided with both projecting lens system and combination lens system also encounters the size problem.

As described above, the projector device according to the former prior art involves the problem of increasing its size with increasing an optical system power.

With the latter projecting optical device that uses a small-size optical device proposed by the same applicant of the present invention, there may occur a problem of optical image distortion, especially, a remarkable curvature of an image because the proposed device has been designed as an enlarging optical system. To enjoy a large-screen image by using, e.g., a liquid crystal display projector, it is very important not to form a largely curved screen image.

The above-mentioned HMD has a restriction that only one person who is putting the HMD can enjoy a screen image. The device disclosed in Japanese Laid-Open Patent Publication No. 6-153121, which was proposed to make the HMD be enjoyed by a plurality of persons, encounters such problems that the size of the whole device is increased and, furthermore, it becomes impossible to display a three-dimensional image that is a main feature of the HMD.

SUMMARY OF THE INVENTION

The present invention relates to a projector using liquid crystal panel and relates, more particularly, to a small-sized, lightweight liquid-crystal projector or a projector that is a combination of a HMD (Head Mounted Display) with a base unit. The present invention has as its objects the provision of:

1. a small and light liquid-crystal projector;
2. a small and light projector for use in combination with a HMD and
3. a projector to be used in combination with a HMD, which is capable of displaying a three-dimensional image.

(1) The present invention is directed to realize a thin, small and light liquid-crystal projector which comprises a back-light for LCD (Liquid Crystal Display), a LCD, a projecting optical device having a reflection type refracting element with a half-mirror coat, a circularly polarized light selecting semitransparent mirror, (the refracting element and the semitransparent mirror are disposed in turn from the LCD side) and a quarter-wave plate interposed between the LCD and the circularly polarized light selecting semitransparent mirror and an optical corrector for optically correcting distortion of a projectable image and wherein the circularly polarized light selecting semitransparent mirror selectively reflects and transmits the incident light depending upon polarizing directions of the light to cause incident light to make a round and a half trip between the reflection type refracting element and the circularly polarized light selecting semitransparent mirror, thereby the optical power (ratio of enlargement) of the refracting optical system can be increased and an image corrected for curved distortion (a curvature of an image surface) can be represented.

(2) The present invention is directed to provide a thin, small and light liquid-crystal projector which comprises a head-mounted display (hereinafter abbreviated as HMD), the HMD being composed of a back-light for directly viewing liquid-crystal display, a liquid crystal display, a reflection type refracting elements with a half-mirror coat, a circularly polarized light selecting semitransparent mirror (the refracting element and the semitransparent mirror are disposed in turn from the liquid-crystal display side), a projecting optical device with a quarter-wave plate interposed between the liquid-crystal display and the circularly polarized light selecting semitransparent mirror, and a base unit which is usable in combination with the HMD and is composed of a projection back-light, back-light selecting means for switching from the liquid-crystal back-light to the projector back-light and vice versa and optical correcting means insertable in an optical path of the HMD for optically correcting distortion of a projectable image, wherein the HMD in combination with the base unit is capable of projecting an image corrected for curved distortion (a curvature of an image surface).

(3) The present invention is directed to realize a thin, small and light liquid-crystal projector as defined in item (2), which is characterized in that a pair of unit combinations of the HMD and the base unit is provided and convergence control means for changing relative positions of the LCD and the optical system composed of the reflection type refracting element with a half-mirror coat and the circularly polarized light selecting semi-transparent mirror is also provided to enable representing three-dimensional image which is visible directly by an observer with one of paired HMD and which is externally projected and displayed through the other HMD.

(4) The present invention is directed to realize a thin, small and light liquid-crystal projector as defined in any one of items (1) to (3), which is further characterized in that the circularly polarized light selecting semi-transparent mirror comprises a second quarter-wave plate, a half-mirror and a polarizer, which components are disposed in turn from the LCD side. This feature can easily realize the effects of the embodiments described in items (1) to (3) since all components of the circularly polarized semi-transparent mirror (i.e., half-mirror, quarter-wave plate and polarizer) can be made thin by existing technology.

(5) The present invention is directed to provide thin, small and light liquid-crystal projector as defined in any one of items (1) to (3), which is further characterized in that the circularly-polarized-light selecting semitransparent mirror is made of a cholesteric liquid crystal, which has higher brightness than the optical system of the embodiment of item (4).

BRIEF DESCRIPTION OF THE DRAWINGS

FIGS. 16(A)–16(C) are partial view showing the operating states (A) and (B) of a mechanism for inserting an optically correcting portion before and after connecting a head-mounted display with a base unit.

(FIG. 18(A) is a side view and FIG. 18(B) is a view from a lens side.)

PREFERRED EMBODIMENT OF THE INVENTION

Prior to explaining preferred embodiments of the present invention, prior art projector devices will be described below as references for the present invention.

The increasing demand for video-viewing pleasure with a large-screen has advanced the development of large-screen image-display devices.

Particularly, liquid crystal projectors have achieved a remarkable advance in development because they can easily realize a large-screen display.

Figure 1:
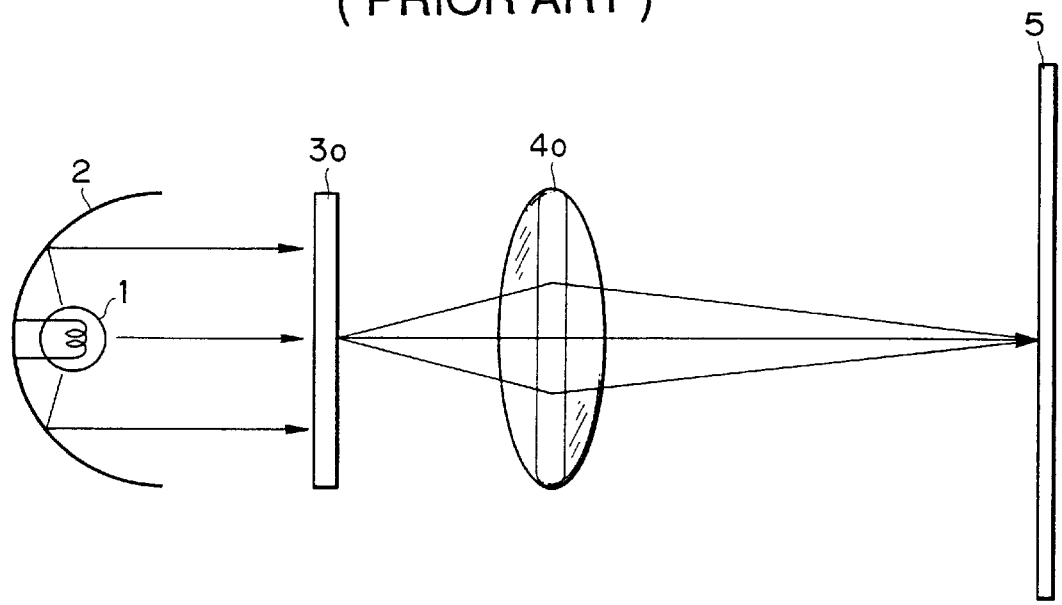
FIG. 1 is a schematic illustration of an optical system of a conventional liquid-crystal projector.

FIG. 1 schematically illustrates an optical system of a conventional liquid-crystal projector.

In FIG. 1, numeral 1 designates a light-source, 2 a reflecting plate, 3o a liquid-crystal panel, 4o a projecting lens and 5 a screen.

Light from the light source 1 is reflected by the reflecting plate 2 to form parallel beams of the source light, which then fall onto the liquid crystal panel 3o. The light beams enter into the liquid crystal panel 3o and become image carrying light that is then projected onto the screen 5o by the projector lens 4o.

To reduce the size of the device and enlarge the screen image, it is most important to increase the power of the projecting lens in the above-mentioned liquid-crystal projector. Prior arts have adopted a combination lens as a projector lens to increase the optical power. This solution, however, encounters a problem that the use of the combination lens increases the size of the projector lens itself, resulting in increasing the size of a whole system of the projector.

Figure 2:
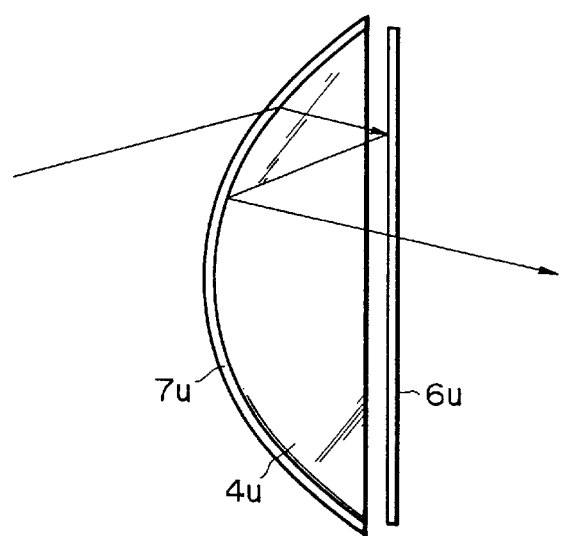
FIG. 2 is illustrative of a small-sized enlarging optical system according to the precedent application.

The present applicant has also proposed an optical device of FIG. 2 for reducing the above-mentioned combination lens. In FIG. 2, the optical device is composed mainly of a lens 4u with a half-mirror coat 7u on one surface and a circularly-polarized-light selecting semitransparent mirror 6u disposed on the non-coated surface side of the lens 4u.

The circularly-polarized-light selecting semitransparent mirror 6u is an optical component that varies its reflection and transmission characteristics depending upon the polarization direction of circularly polarized light. In this example, it is assumed that the semitransparent selecting mirror 6u reflects clockwise-circularly-polarized light and transmits counterclockwise circularly polarized light. Incident light from the left side in FIGS. 6(A)–6(D) is assumed as clockwise circularly polarized. The half-mirror coat 7u applied to the convex surface of the lens reflects 50% of the incident light being clockwise circularly polarized and transmits the rest (50% of the incident light).

The reflected light is not used and the transmitted light is refracted at the convex surface of the lens 4u and going in the lens 4u. The refraction can not change the direction of the circular polarization of the light. So, the light as clockwise circularly polarized passes the plane surface of the lens 4u and arrives at the circularly-polarized-light selecting semi-transparent mirror 6u which in turn reflects clockwise circularly polarized light as it is. The reflected light reaches again the convex surface of the lens 4u where the half-mirror coat 7u reflects 50% of the light and transmits 50% of the light. The light transmitted through the half-mirror coat 7u is not used. The reflected light changes its polarization direction, i.e., becomes counterclockwise circularly polarized light. It passes the plane surface of the lens 4u and the circularly-polarized-light selecting semitransparent mirror 6u and goes out of the optical device.

In comparison with a conventional optical device containing a plurality of lenses for increasing the optical power, this optical device can obtain the same optical power at a shorter optical length reduced to about ⅕, thereby the optical device may have a reduced size and weight. Application of the optical device to projecting optics may realize a small-sized projector with large screen.

The above-mentioned optical device has also been proposed to use as an enlarging optical system in a head mounted display (hereinafter abbreviated as HMD).

Figure 3:
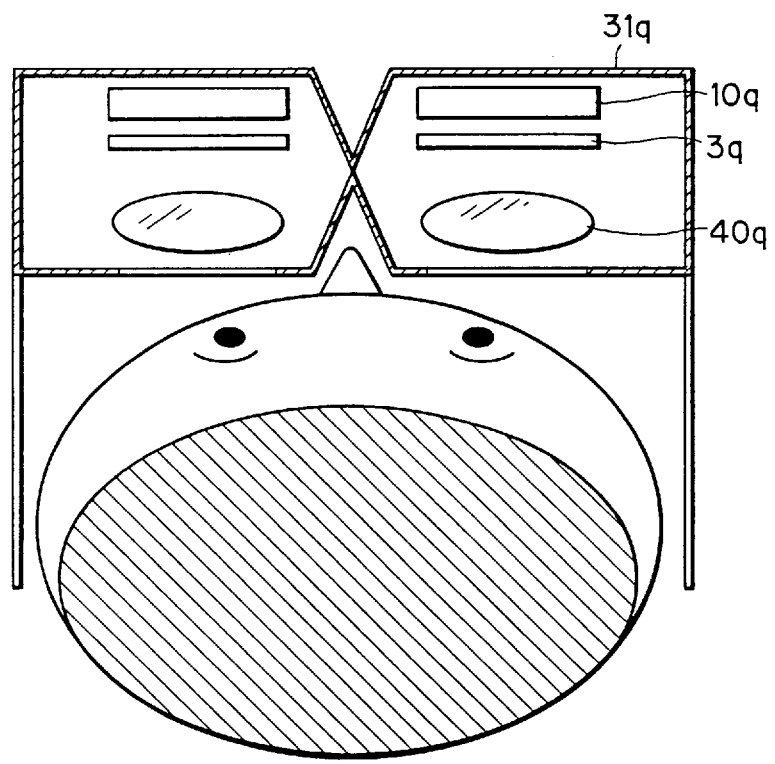
FIG. 3 is a construction view of a head-mounted display (HMD) which includes, as its component, the optical system of FIG. 2.

FIG. 3 illustrates a structure of a HMD for enjoying a large-screen image. The HMD is a spectacle-type case 31q containing a whole system for realizing enlarged-screen viewing pleasure, which is used as mounted on the head of a user.

The HMD has two eye-portions each containing a set of a back-light 10q, a liquid crystal panel 3q and an enlarging optical system 40q, which are arranged in turn from the external (front) side of the case. A user can view an enlarged image of the liquid crystal panel 3q in the HMD through the eye portions.

Figure 4:
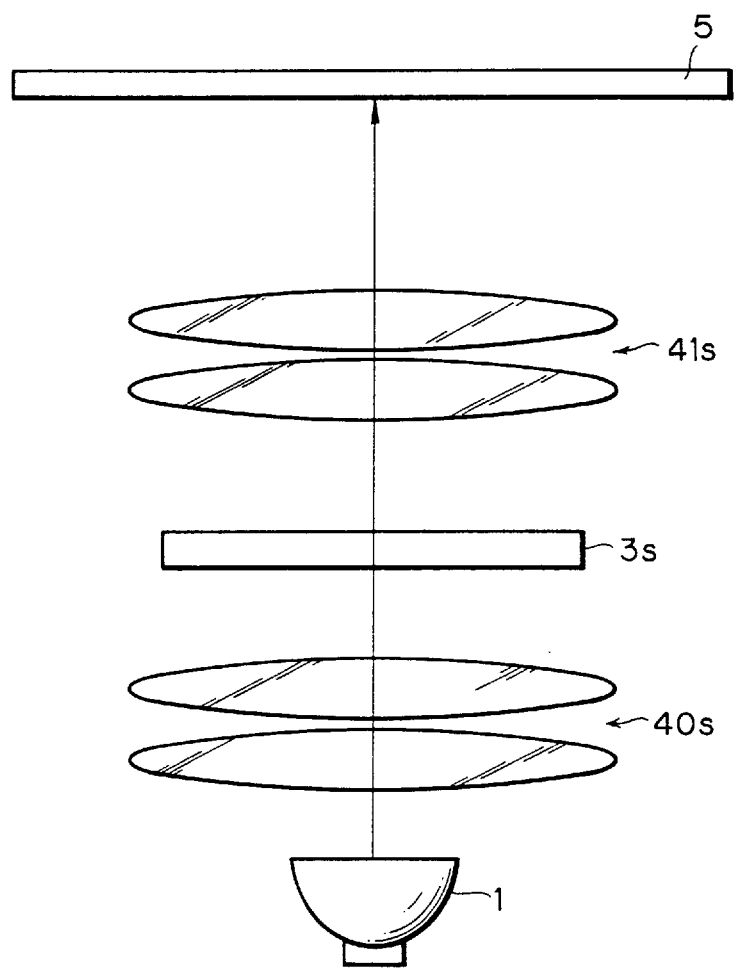
FIG. 4 is illustrative of a conventional projector that is composed of a HMD and a projecting device.

The HMD, however, has the following problems:

The HMD can be used by one user only and can not be observed by other persons at a time. Concerning this problem, Japanese Laid-Open Patent Publication No. 6-153121 discloses such a device that combines a HMD with a projector to project an image on a common screen to be observed at a time by a plurality of persons. This device, shown in FIG. 4, is composed mainly of a light source 1, an LCD (Liquid Crystal Display) 3s, a group of enlarging lenses 40s of the HMD and a group of projecting lens 41s.

These lens sets, of course, require the use of conventional combination lens system for increasing the optical power. Consequently, the device provided with both projecting lens system and combination lens system also encounters the size problem.

(Embodiment 1)

Figure 5:
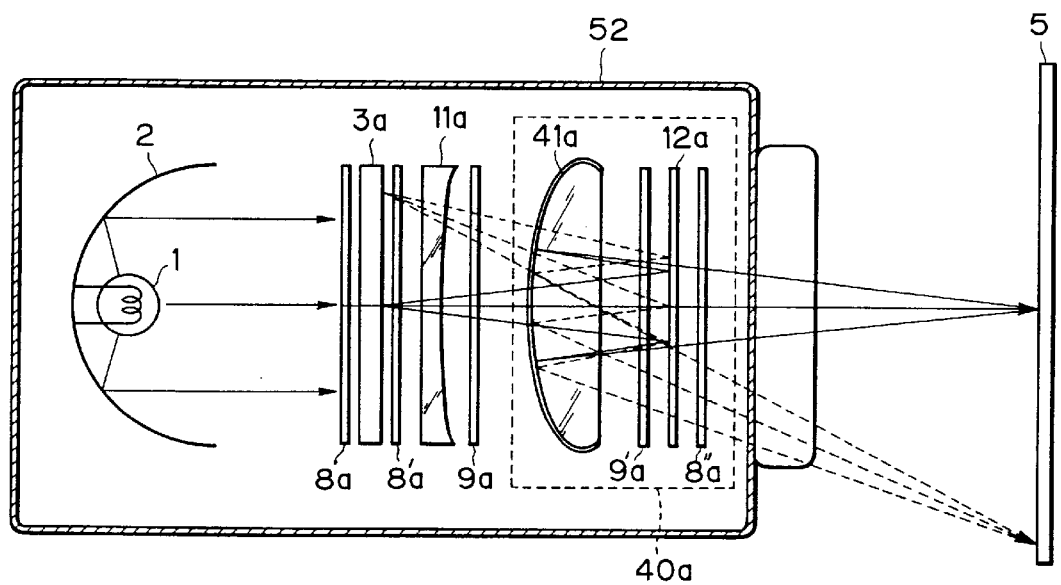
FIG. 5 is a view showing a small-size liquid crystal projector embodying the present invention and its operating state.

FIG. 5 is illustrative of an essential construction of an embodiment of the present invention. In FIG. 5, the embodiment comprises a light source 1, a reflecting mirror 2, polarizers 8a, 8'a, 8"a, a liquid-crystal panel 3a, an optical correcting portion 11a, a plano-convex lens 41a with a half-mirror coat applied onto the convex surface, quarter-wave plates 9a, 9'a, a half-mirror 12a and a screen 5 for forming a light image thereon. All components except the screen 5 are accommodated in a projector case 52. A projecting optical device 40a is composed of the plano-convex lens 41a, quarter-wave plate 9'a, half-mirror 12a and polarizer 8"a.

Referring to FIGS. 6(A)–6(D), a particular important optical part of the projecting optical device 40a is a circularly-polarized-light selecting semitransparent mirror that is composed of a quarter-wave plate, a half-mirror and a polarizer.

Figure 6:
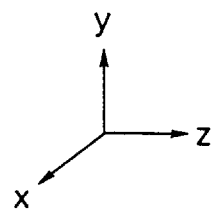
FIGS. 6(A)–(D) are illustrative of an example of a circularly polarized mirror used in a projector according to the present invention and its operation state.
Figure 6:
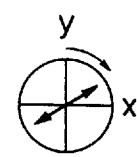
Figure 6:
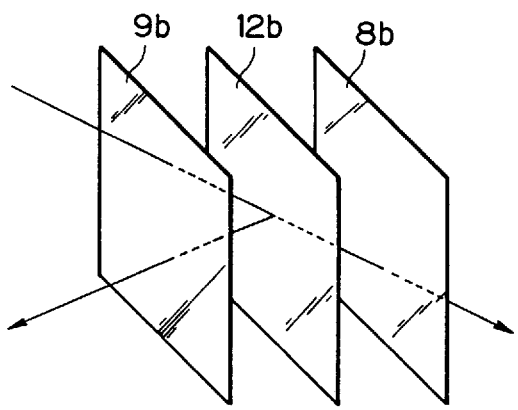
Figure 6:
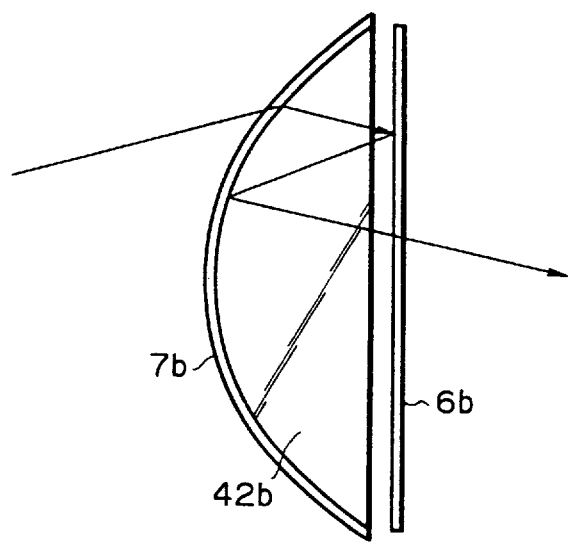

Coordinates to be referred in the description are first defined as follows:

As shown in FIG. 6(A), x-axis is perpendicular to the paper and directed to this side, y-axis is parallel to the paper and directed upwards and z-axis is perpendicular to x-axis and y-axis and directed to the right along the paper. In FIG. 6(B), a rotation angle is determined as an angle formed with y-axis in a plane x-y when viewing along z-axis. Clockwise rotation angle is positive (+). Regarding the quarter-wave plate, it is defined that polarized light in the direction perpendicular to the optic axis of the crystal has a phase lag by quarter-wavelength from polarized light in the direction along the optic axis of the crystal. The polarizer transmits polarized light along the crystal axis and absorbs polarized light perpendicular to the crystal axis.

The above-mentioned definitions are applied to all drawings and description to be made hereinafter unless otherwise specified.

As FIG. 6(C) indicates, the circularly-polarized-light selecting semitransparent mirror has a quarter-wave plate 9b, a half mirror 12b and polarizer 8b, which are arranged in turn from the incidence side. The crystal axis of the quarter-wave plate 9b is directed to the direction of y-axis (0 degree) and the crystal axis of the polarizer 8b is directed to the direction of 45° from y-axis.

Reflectance and transmittance of incident circularly polarized light by the circularly-polarized-light selecting semi-transparent mirror depend upon the rotation direction of the cicularly-polarized light. Clockwise-circularly-polarized light passes the quarter-wave plate 9b being converted to light linearly polarized in the direction of −45°. This linearly polarized light falls on the half-mirror 12b whereby it is divided into reflected light (50%) and transmitted light (50%). The reflected light enters again into the quarter-wave plate 9b whereby it is converted to a clockwise-circularly-polarized light that returns to the incident side.

On the other hand, the transmitted light reaches the polarizer 8b and absorbed therein since it is polarized in the direction perpendicular to the crystal axis. Accordingly, the clockwise-circularly-polarized light is only reflected and can not pass through the circularly-polarized-light selecting semitransparent mirror.

Counterclockwise-circularly-polarized light enters from the left and passes the quarter-wave plate 9b being converted to light linearly polarized in the direction of +45°. This light is divided by the half-mirror 12b into reflected light (50%) and transmitted light (50%). The reflected light passes again the quarter-wave plate 9b whereby it is converted to counterclockwise-circularly-polarized light that returns to the incident side.

On the other hand, the transmitted light passes the polarizer 8b and goes out to the right since it is polarized in the same direction as the crystal axis. Consequently, the reflectance and transmittance of the clockwise-circularly-polarized light are 50% and 0% respectively while those of the counterclockwise-circularly-polarized light are 50% and 50% respectively.

Referring to FIG. 6(D), the projecting optical device 40a is described as follows:

In FIG. 6(D), the projecting optical device 40a is composed of a lens with a half-mirror coat on one surface and a cicularly-polarized-light selecting semitransparent mirror disposed on the other surface.

In the embodiment of the present invention, a plano-convex lens 42 whose convex surface covered with a half-mirror coat 7b acts upon clockwise circularly polarized light incident thereto from the left (on the paper). Reflection and transmission of light by this optical device are as follows:

Incident clockwise-circularly-polarized light falls from the left (in FIG. 6(D)) onto the half-mirror 7b on the convex surface of the lens 42b, whereby 50% of the incident light is reflected back therefrom and 50% of the incident light is transmitted therefrom. The reflected light is not used and the transmitted light is refracted at the convex surface of the lens 42b and going in the lens. The refracted light can not change the polarization direction, so the light as clockwise circularly polarized passes the plane surface of the lens 42b and arrives at the circularly-polarized-light selecting semitransparent mirror 6b which in turn reflects clockwise circularly polarized light as it is. The reflectance ratio is 50%. The reflected light reaches again the convex surface of the lens 42b where the half-mirror coat 7b reflects 50% of the light and transmits 50% of the light. The light transmitted through the half-mirror coat 7b is not used. The reflected light has a changed polarization direction, i.e., becomes counterclockwise circularly polarized light that passes the plane surface of the lens 42b and the circularly-polarized-light selecting semitransparent mirror 6b and goes out of the projecting optical device 40a. The transmittance ratio of the finally transmitted light is 50%.

It is known that a curved reflecting surface usually has the optical power four times larger than that of a curved refracting surface of the same curvature radius. In the above described case, the incident light is subjected to one refracting action and one reflecting action of the lens during one round and half trip between both surfaces of the lens. Consequently, the optical projection system uses the lens having the optical power five times larger the optical power in comparison with a lens used only for refracting light.

A typical specification on the above-mentioned optical projection device is as follows:

The lens system uses a standard 60 mm diameter lens. In view of the size (1.5–2 inches) of a liquid crystal display with which the optical system is used, the single lens is designed as follows:

Material: Glass-made plano-convex lens

Diameter: 60 mm

Focal length: 120 mm

Radius of convex surface curvature: 60 mm

Center thickness: 10 mm

Figure 7A:
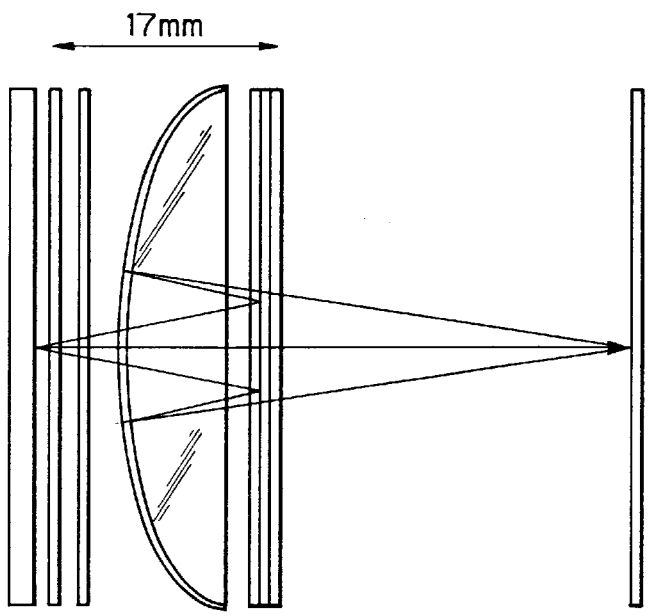
FIG. 7A is a view for explaining an example of a projecting optical device according to the present invention.

FIG. 7A illustrates an optical device having a projection system made of the above-mentioned lens, which is designed for use with a liquid-crystal panel and the like. This optical device has the following specification:

Synthesized focal length: 23 mm

Figure 7B:
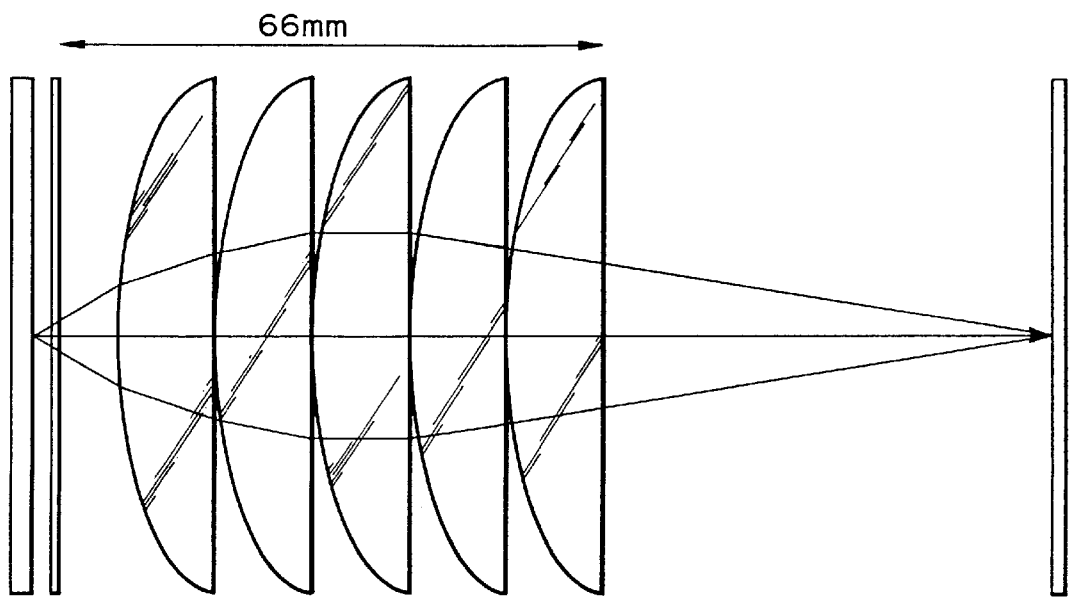
FIG. 7B is a view for explaining an example of a conventional projecting optical device in comparison with the example shown in FIG. 7A.

Thickness from the display surface to lens end (including the circularly-polarized-light selecting semitransparent mirror): 17 mm Weight: 48 g In FIG. 7B, there is shown, for comparison, an optical system composed of five single lenses, which possesses the same optical power as the above-mentioned embodiment of the present invention. This optical device has the following specification:

Synthesized focal length: 29 mm
Thickness from the display surface to lens end (including the circularly-polarized-light selecting semitransparent mirror): 66 mm
Weight: 240 g As is apparent from the comparison of FIGS. 7A and 7B, the optical device of FIG. 7A realizes increasing its optical power and saving in thickness by 49 mm and in weight by 192 g. Namely, the projecting optical device can save its optical path length by five times as compared with the conventional optical device, thereby realizing saving in its size and weight. The use of this optical device can therefore realize a small-size light-weight projector.

Referring to FIG. 5, the operation of the projector embodying the present invention is described below:

The reflector 2 reflects light emitted from the light source 1 toward the liquid-crystal panel 3a. The liquid-crystal panel 3a such as a widely used twisted nematic liquid-crystal panel and the polarizer 8'a convert passing light to linearly polarized light whose polarization direction is assumed to be along y-axis. The optic axis of the crystal of the quarter-wave plate 9a is also assumed to be directed in the direction of −45° in relation to y-axis.

Light passed through the liquid-crystal panel 3a and the polarizer is linearly polarized light carrying image-information, which is then corrected for curvature of the image by the optical correcting portion 11a and converted to clockwise-circularly-polarized light by the quarter-wave plate 9a. The converted light enters the above-mentioned projecting optical device to form a light image onto a screen 5.

Figure 8:
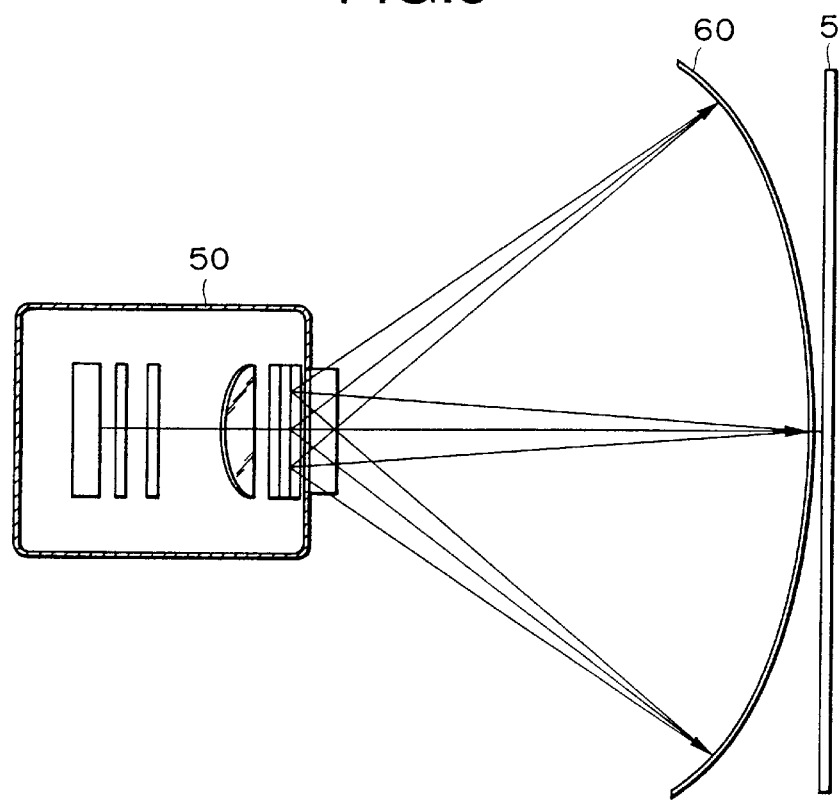
FIG. 8 is a view for explaining a curvature of an image surface (field) caused by a projecting optical device consisting of the same optical system as that of a head-mounted display (HMD) used in a liquid-crystal projector according to the present invention.

The optical correcting portion 11a is explained as follows:

The projecting optical device used in the embodiment of the present invention is designed for use as an enlarging optical unit for a head-mounted display (HMD). Application of the projecting optical device in the projector 50 therefore forms a curvature of an image surface (field) 60 as illustrated in FIG. 8. Namely, the light image projected onto the screen 5 is fuzzy at its circumferential portion. The optical correcting portion 11a usable for correcting the image curvature is a fiber optics plate (hereinafter abbreviated as FOP).

The FOP is an optical device of the multi-fiber type that contains a bundle of single fibers each of several microns in diameter and is capable of effectively transmitting incident light.

The optical correcting portion gives the light from liquid crystal panel a curvature reverse to a curvature of an image surface to be caused by the projecting optical device. This enables projecting the light image with a minimum curvature of an image surface onto the screen 5.

Accordingly, the optical device designed as an enlarging optical device becomes usable as the projecting optical device in the embodiment of the present invention. This facilitates the development of small-size liquid-crystal projectors. The above-mentioned solution also makes it possible to use an enlarging optical device of a head-mounted display as a projecting optical device in embodiments of the present invention, which will be described later. According to the present invention, it is possible to provide a small and light liquid-crystal projector.

Figure 9:
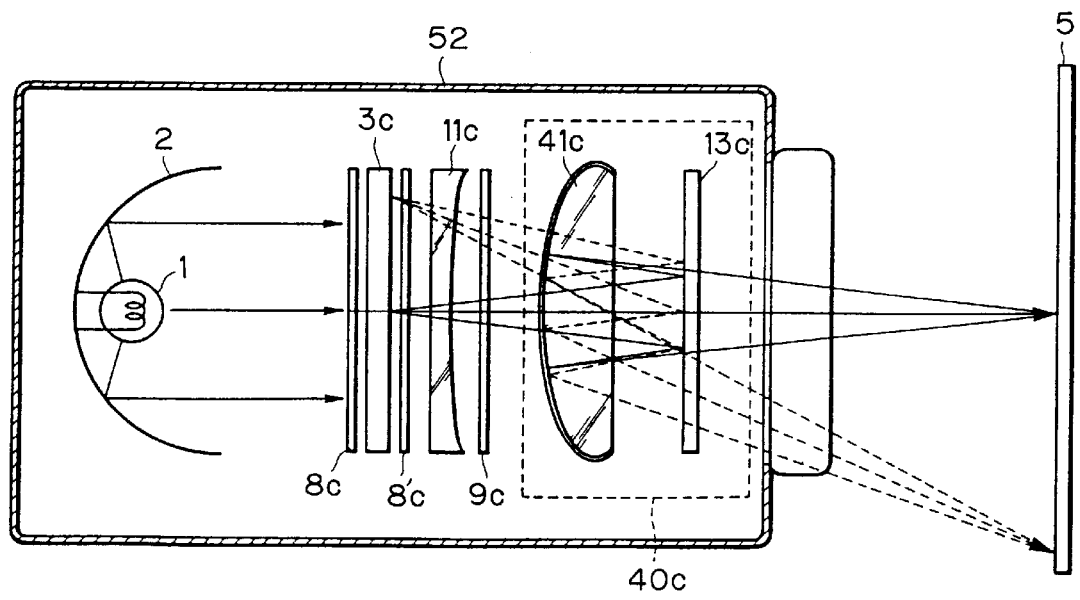
FIG. 9 is a view for explaining another liquid-crystal projector embodying the present invention and the operation of the projector.

FIG. 9 is illustrative of an essential portion of another embodiment of the present invention. In FIG. 9, the embodiment comprises a light source 1, a reflecting mirror 2, polarizers 8c, 8'c, a liquid-crystal panel 3c, an optical correcting portion 11c, a quarter-wave plate 9c, a plano-convex lens 41c with a half-mirror coat applied onto the convex surface of the lens, a cholesteric liquid crystal 13c and a screen 5 for forming a light image thereon. All components except the screen 5 are accommodated in a projector case 52. A projecting optical device 40a is composed of the plano-convex lens 41a and the cholesteric liquid crystal 13c. Namely, this embodiment uses the cholesteric liquid crystal 13c in place of the circularly-polarized-light selecting semitransparent mirror of the embodiment hereinbefore described, which is composed of a quarter-wave plate 9'c, a half-mirror 12c and a polarizer 8"a.

Figure 10:
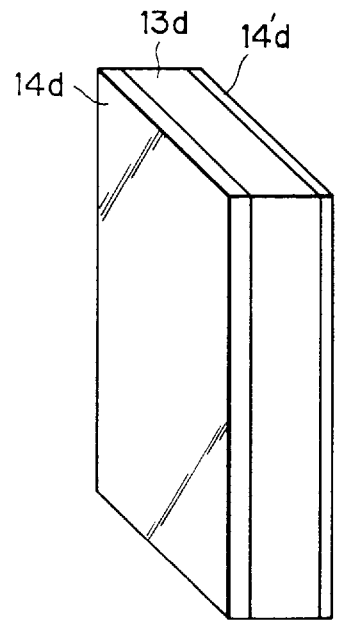
FIG. 10 is a view for explaining a circularly polarized light selecting semitransparent mirror made of cholesteric liquid crystal.

Referring to FIG. 10, a cholesteric liquid crystal that serves as a circularly-polarized-light selecting semitransparent mirror is described below:

As shown in FIG. 10, the cholesteric crystal is made of cholesteric liquid crystal 13d filled between two glass plates 14d and 14'd. The liquid crystal is prepared by vertically aligning molecules of cholesteric crystal on one of treated substrate and sandwiched between two glass plates with sealing. The liquid crystal shown in FIG. 10 is liquid and therefore needs glass plates 14d and 14'd. Glass plates may be omitted if liquid crystal capable of solidifying.

Cholesteric liquid crystal itself has such a property that it can reflect or transmit circularly polarized light depending upon the polarizing direction of the light, which is defined according to the alignment control of the liquid crystal. For example, if the liquid crystal is prepared to reflect clockwise-circularly-polarized light, it can transmit all counterclockwise-circularly-polarized light in an ideal case. Namely, the liquid crystal can realize 100%-reflection and 0%-transmission of clockwise-circularly-polarized light and 0%-reflection and 100%-transmission of counterclockwise-circularly-polarized light.

The circularly-polarized-light selecting semi-transparent mirror (cholesteric liquid crystal) of FIG. 10 can be used as an effective optical element in the embodiment of the present invention since it completely changes reflection or transmission characteristic depending upon the polarization direction of circularly polarized light.

By applying the circularly-polarized-light selecting semi-transparent mirror made of a cholesteric liquid crystal instead of that composed of a quarter-wave plate 9'a, a half-mirror 12a and a polarizer 8"a, which is used in the device of the embodiment hereinbefore described, it is possible to provide a further compact and light liquid-crystal projector. Another advantage of this embodiment is high efficiency of using light. Namely, this embodiment using the cholesteric liquid crystal attains the brightness four times (two times in reflection×two times in transmission) higher than that of the embodiments hereinbefore described.

Although this embodiment uses the cholesteric liquid crystal in the form of an element 13c disposed close to the plane surface of the plano-convex lens 41c, a better optical device may be realized by forming a film of cholesteric liquid-crystal to the plane surface of the lens 41c. One of methods for applying a film of cholesteric liquid crystal to the plane surface of the plano-convex lens is described below:

A mixed solution of cholesteric liquid crystal monomers and initiator is prepared and applied evenly to an entire plane surface of the plano-convex lens. The coated plane surface of the lens is then exposed to ultraviolet rays. The cholesteric liquid crystal is polymerized to form a solid polymer coat on the plane surface of the plano-convex lens.

The embodiment using the above-mentioned optical device may have reduced size and weight.

Figure 11:
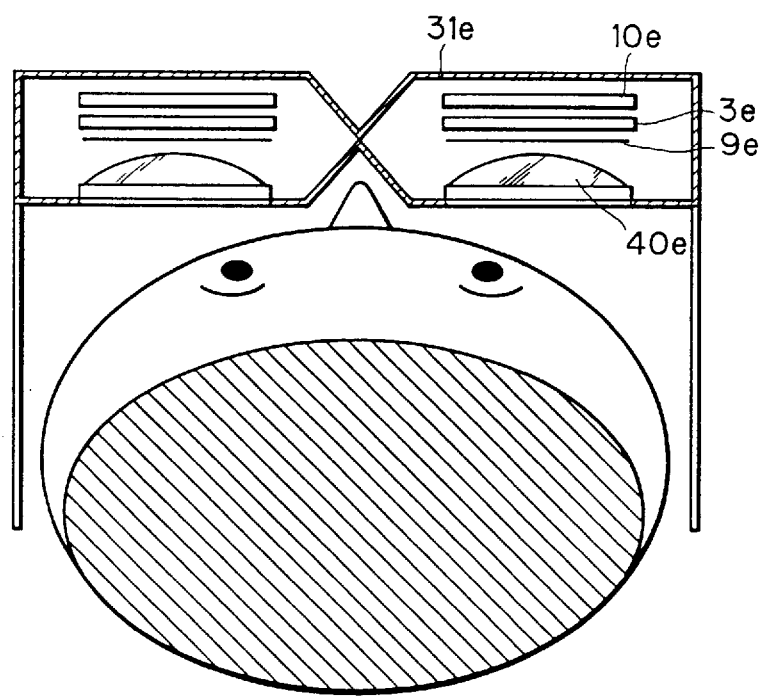
FIG. 11 is a construction view of an example of a head-mounted display used in a liquid-crystal projector according to the present invention.

FIG. 11 is a schematic construction view of a head-mounted display (HMD) according to another embodiment of the present invention.

The HMD is a spectacles-type case 31e wherein all components are contained and which is mounted on the head of a user. In each eye-piece portion of the case 31e, there are arranged in turn from the front external side thereof a back-light 10e, a liquid-crystal panel 3e, a quarter-wave plate 9e and an enlarging optical system 40e. In FIG. 11, the enlarging optical system 40e also uses, as an enlarging optical device, the projecting optical device (40a in FIG. 5 or 40c in FIG. 9) used in two above-mentioned embodiments. Namely, the liquid-crystal panel 3e is disposed within the focal distance of the optical system 40e to represent a virtual image of light from the liquid-crystal panel 3e.

This HMD is the same that the present applicant proposed before. It is provided with a compact type enlarging optical device 40e to realize a small and light HMD capable of representing a large-size screen image with an increased visual reality. The HMD is now combined with a base unit (to be described later) to provide a small and light projector.

Figure 12:
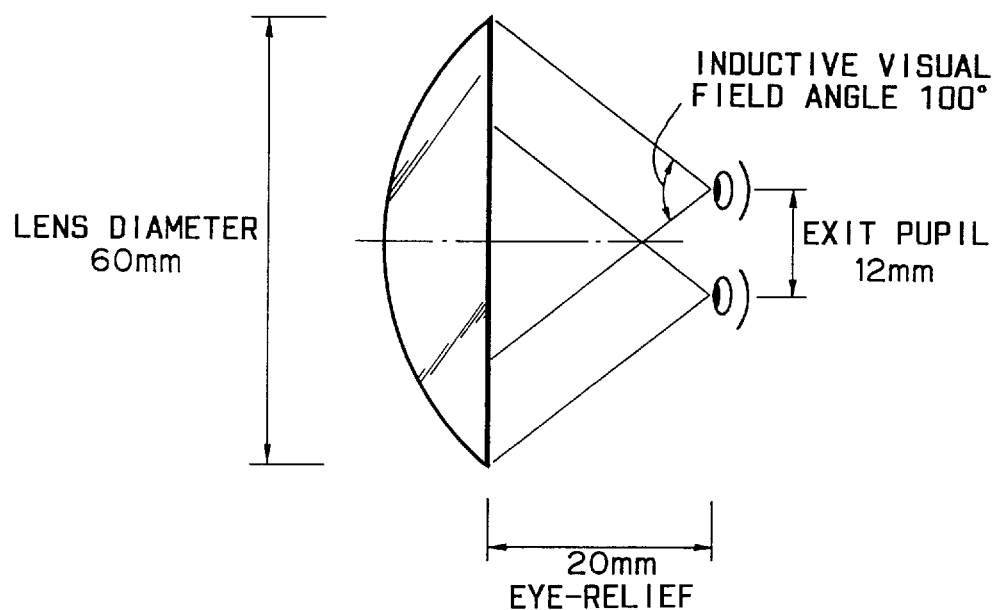
FIG. 12 is a view for explaining required specification of a head-mounted display to be used by the present invention.

The required technical specifications on the HMD are as follows:

FIG. 12 is a view for explaining required specification of a head-mounted display.

Referring to FIG. 12, a field-of-vision angle necessary for producing an increased reality and power of a visual representation must be not less than 100° (opposite angle) since an inductive visual field necessary for creating subjective coordinate axes of human exists within 100°. An exit pupil large enough for eyes to make the round of a wide visual field is 12 mm. An eye-relief large enough to allow a spectacled person to view is 20 mm. A 1.6-inch liquid-crystal panel is used as a display for realizing reduction in size of the device. A diagonal size of the display is 40 mm. A diameter and a focal distance of a usable lens are determined as follows:

The lens diameter must be 60 mm so that a field-of-vision angle of 100° can be obtained from any position of the exit pupil.

(Expression 1)

$$(\text{Lens Diameter}) = (\text{Exit Pupil Diameter}) + 2*(\text{Eye-Relief})*\tan[(\text{Visual Field Angle})/2] \quad (1)$$

Focal distance must be 16.8 mm (short focus) according to the expression 2 (paraxially calculated).

(Expression 2)

$$(\text{Focal distance}) = (\text{Diagonal Size of the panel})/(2*\tan[(\text{Visual Field Angle})/2]) \quad (2)$$

The above-mentioned data are tabulated as follows:

TABLE 1

| Parameters | Values |
| --- | --- |
| Visual field angle of Diagonl visual-field | 100 deg. |
| Exit Pupil | 12 mm |
| Eye-Relief | 20 mm |
| Panel Diagonal Length | 40 mm |
| Lens Diameter | 60 mm |
| Focal Distance | 16.8 mm |

Figure 13:
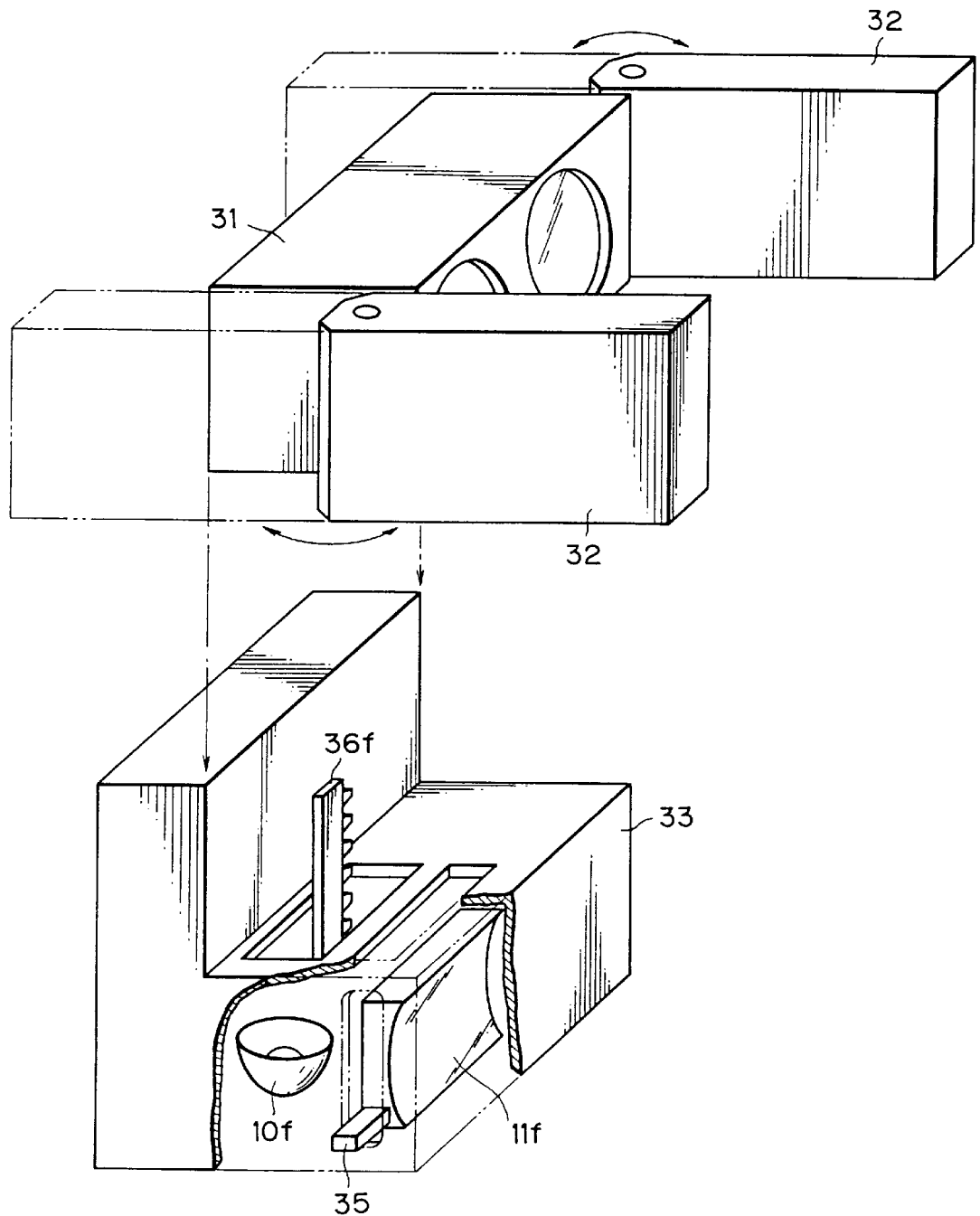
FIG. 13 is a view for explaining a head-mounted display (HMD) and a base unit used in combination of the HMD and a method of connecting the HMD with the base unit.

The base unit is described below:

FIG. 13 is a view for explaining a head-mounted display (HMD) and a base unit. In FIG. 13, there is shown a HMD 31 to be connected to a base unit, a mounting temple 32 of the HMD, a base unit housing 33, a projector back light 10f, an optical correcting portion 11f, an inserting mechanism 35 for inserting the optical correcting portion 11f into the HMD 31 when connecting the HMD with the base unit and a light-source changing mechanism 36f for changing a back-light of a liquid-crystal display to the projector back-light 10f.

Figure 14:
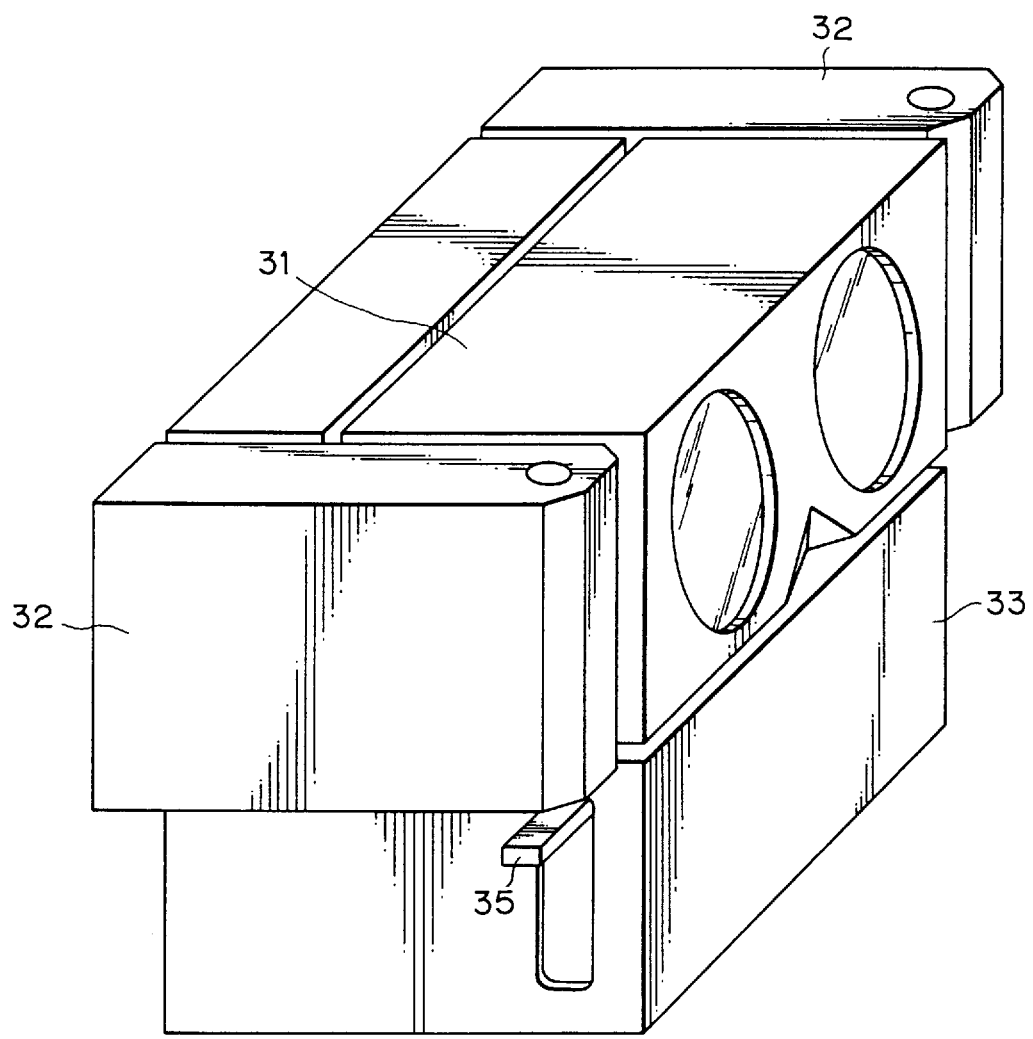
FIG. 14 is a view showing a head-mounted display and a base unit in the state connected with each other.

As shown in FIG. 13, the temples 32 of the HMD can be bent by 180° respectively in directions indicated by arrows when connecting the HMD to the base unit 33. In connecting the HMD with the base unit, the light-source changing mechanism 36f selects the projector back-light 10f so that light from the back-light 10f can enter the liquid-crystal panel. The optical correcting portion 11f is inserted by the inserting mechanism 35 into the HMD to convert the enlarging optical device to a projecting optical device by changing the focal length. Thus, the assembled device can be used as a projector as shown in FIG. 14.

Figure 15:
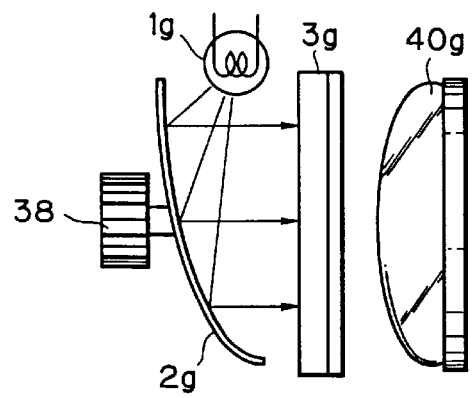
FIGS. 15(A)–(C) are partial views for explaining illumination by a back light and the action of a light source changing mechanism according to the present invention.
Figure 15:
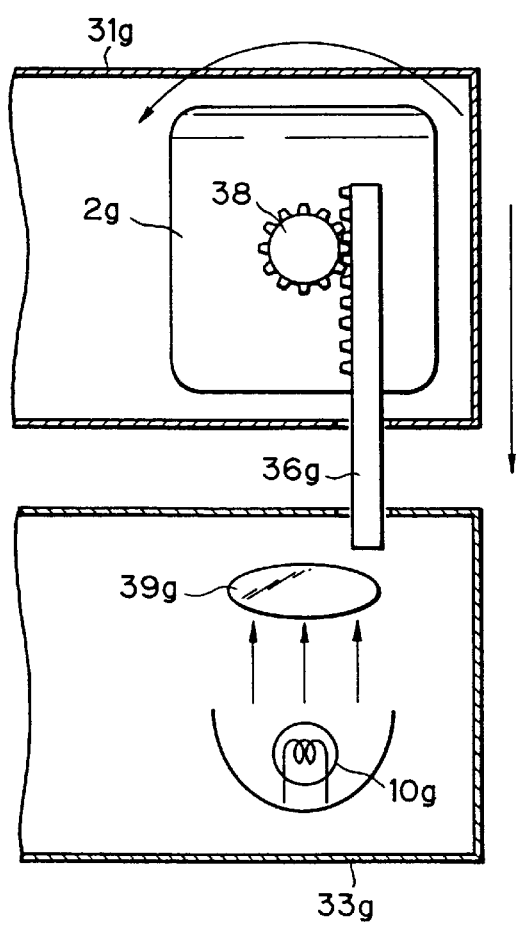
Figure 15:
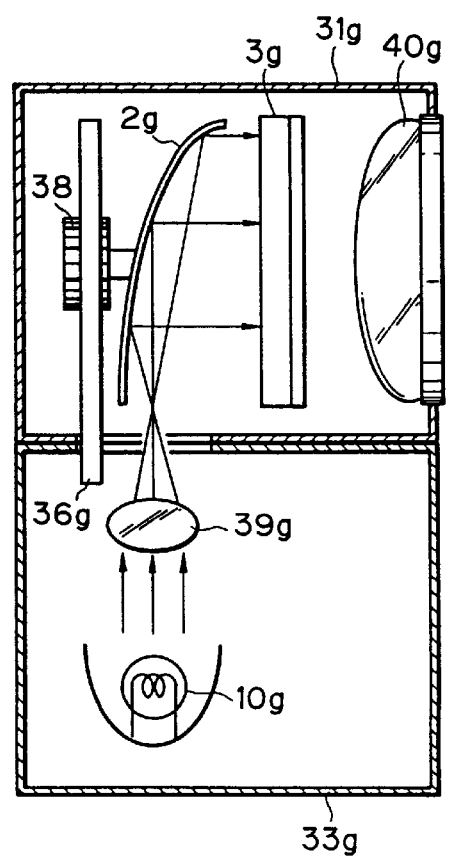

Referring to FIGS. 15(A)–15(C), the function of the light-source changing mechanism 36f is described below:

FIG. 15(A) is a partially enlarged view of a back-light when using the HMD. In FIG. 15(A), there is shown an enlarging optical system 40g, a light-source 1g, a parabolic mirror 2g and a liquid-crystal panel 3g.

As shown in FIG. 15(A), light from the light-source 1g reflected from the parabolic mirror 2g enters into the liquid-crystal panel 3g.

FIG. 15(B) shows the action of the light-source changing mechanism 36g, which corresponds to a view of FIG. 15(A) when viewing from the parabolic mirror side.

In FIG. 15(B), there is shown a gear 38 attached to the parabolic mirror 2g, a mechanism 36g attached to the base unit, a projector back-light 10g, a HMD case 31g and a base-unit housing 33g.

When the HMD is connected to the base unit, the parabolic mirror 2g is turned by 180° by the action of the gear 38 with the mechanism 36g. FIG. 15(C) is a partially enlarged view of a back-light when the HMD and the base unit are assembled to use as a projector. As is apparent from FIG. 15(C), light from the light source mounted in the base unit passes a converging convex lens 39b, reflected from the parabolic mirror 2g (as turned by 180°) and enters into the liquid-crystal panel 3g. When the HMD is removed from the base unit, the parabolic mirror is turned by 180° to the initial position as shown in FIG. 15(A).

Referring to FIG. 16, the optical-correcting-portion inserting mechanism is described below:

FIGS. 16(A)–16(B) is a partially enlarged view showing the operation of the mechanism when inserting the optical correcting portion into the HMD.

After connecting the HMD to the base unit, a user moves a knob 61 up to insert an optical correcting portion 11h into a space between a liquid-crystal panel 3h and an optical device 40h.

In this embodiment, the optical correcting portion 11h is a fiber optics plate (FOP) described before in the foregoing embodiment. The optical correcting portion 11h can be held in a working position between the liquid crystal panel 3h and the optical device 40h by a working stopper 62 when working and in a home position in the base unit housing 33h by a home stopper 62 when storing. Before removing the HMD from the base unit the user moves the knob 61 down to the stopper to store the optical correcting portion 11h in the home position in the base housing 33h.

Figure 17:
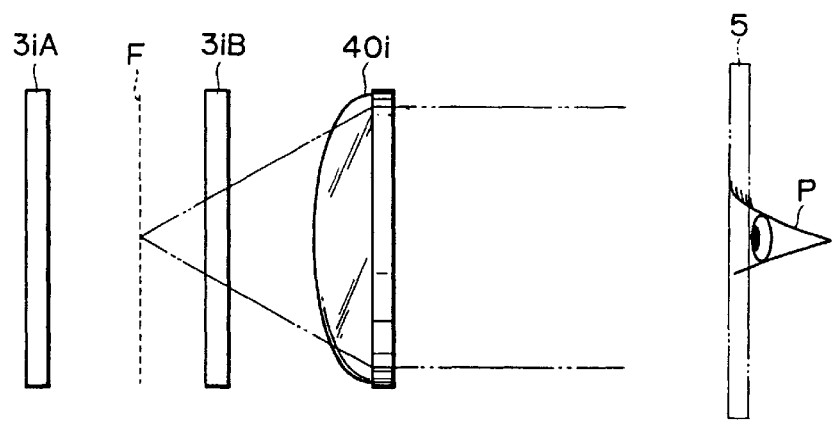
FIG. 17 is a view showing relative positions of a liquid-crystal panel and an enlarging optical system when a head-mounted display being in operating condition and a projector being in operating condition.

Referring to FIG. 17, the method for converting a projecting optical device to an enlarging optical device and vice versa is described below.

FIG. 17 shows relative positions of a liquid-crystal panel and an enlarging optical device. In FIG. 17, there are shown liquid crystal panels 3iA and 3iB, an optical device 40i with a focal point indicated by dotted line F. When the head-mounted display (HMD) works with the optical device 40i used as an enlarging optical device, the liquid-crystal panel is placed in a position 3iB (shorter than the focal length of the optical device 40i), thus allowing a user to view a virtual image of the liquid crystal panel 3iB. When the liquid crystal panel is used as a projector, it is placed in a position 3iA (outside the focal distance F of the optical device 40i) to reverse display of the liquid crystal panel 3iA, thus forming a light image on a screen 5.

This image display reversing function is a standard function of the liquid crystal panel, which function is effected by reversing the electric connection when the HMD is connected with the base unit.

Figure 18A:
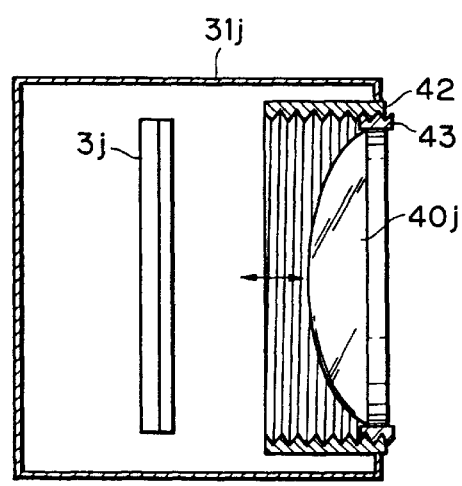
FIGS. 18(A)–18(B) are partial views of an adjusting mechanism of an optical system of a head-mounted display to be used by the present invention.
Figure 18B:
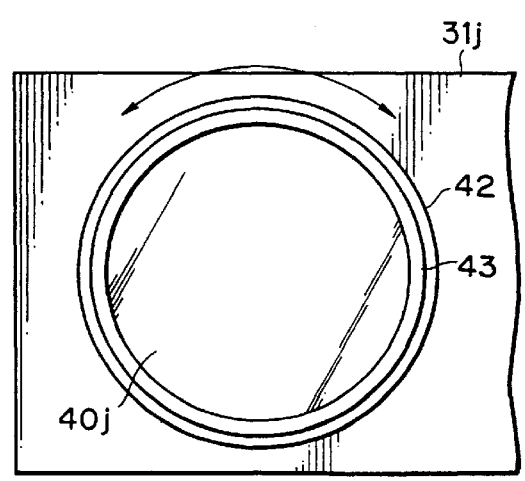

The displacement of the liquid crystal panel is effected by means of an adjusting mechanism in the HMD. FIGS. 18(A)–18(B) is a partial enlarged view showing an adjusting mechanism of the HMD. In FIGS. 18(A)–18(B) there are shown an optical device 40j, mechanisms 42, 43, a liquid crystal panel 3j and a HMD case 31j. The mechanism 43 is jointed to the optical device 40j and has a screw thread for engaging with a screw thread of the mechanism 42. Accordingly, the optical device 40j can be displaced forwards or backwards by turning the optical device clockwise or counterclockwise as indicated by arrows in FIG. 18(B). By doing so, the relative positions of the liquid crystal panel 3j and the optical device 40j can be adjusted.

These mechanisms can be also used for adjusting the focus of the lens for compensating eyesight of a person who uses the HMD.

The HMD assembled with the base unit can be used as a projector after placing the liquid crystal panel in the position 3iA (FIG. 17) relative to the optical device by displacing the latter.

Figure 19:
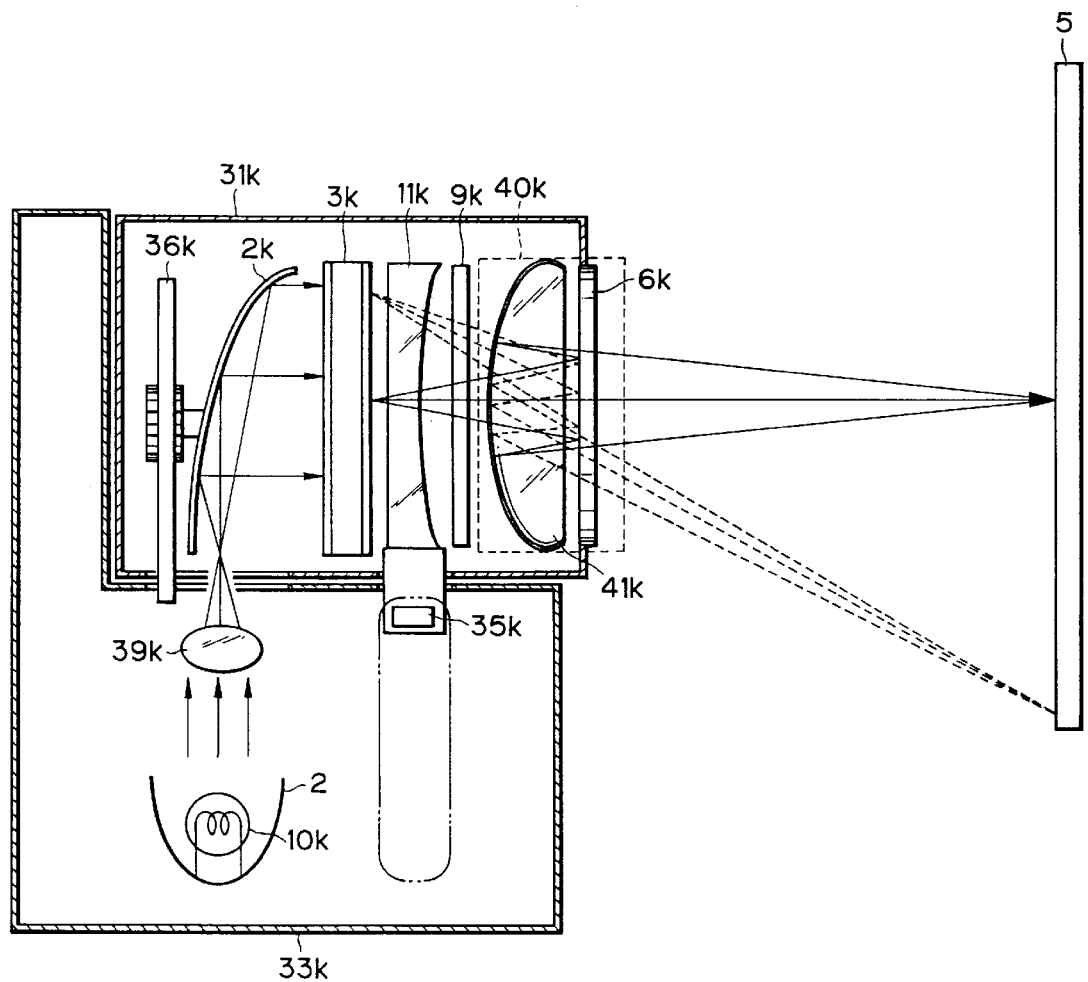
FIG. 19 illustrates a projector according to the present invention, which is a combination of a head-mounted display and base unit with an illustration of light in an operating state.

Referring to FIG. 19, the operation of this embodiment is described below.

FIG. 19 is a view for explaining a projector with its working optical system according to the present invention. Light from a back-light 10k is reflected by a reflecting mirror 2, collected by a convex lens 39k, reflected by a parabolic mirror 2k and then, enters as source light into a liquid crystal panel 3k.

Image information carrying light from the liquid crystal panel 3k is corrected for curvature of the image surface by an optical correcting portion 11k and converted by a quarter-wave plate 9k to clockwise-circularly-polarized light that is then projected through a projecting optical device 40k and forms a light image on a screen 5.

The projecting optical device 40k is composed of a plano-convex lens 41k having a half-mirror coat on the convex surface and a circularly-polarized-light selecting mirror 6k. The circularly-polarized-light selecting mirror 6k is composed of a quarter-wave plate, a half-mirror and a polarizer (as used in the aforementioned embodiment) or made of cholesteric liquid crystal (as used in the aforementioned embodiment).

Accordingly, this embodiment has the same specification of the projector as described in the foregoing embodiments.

The differences of this embodiment from the conventional devices are as follows:
1. An enlarging optical device 40k of the HMD is applied as a projecting optical device, thereby eliminating the need of using a group of lenses shown in FIG. 4.
2. A small-size optical device in place of a combination lens is used as the optical device 40k. Owing to the above-mentioned design features, the embodiment realizes remarkable savings in size and weight in comparison with the conventional device. Projectors according to the present invention can be realized by adopting the above-mentioned design solutions.

In the shown embodiment, the HMD has either one display system for the left eye or the right eye or two display systems for both eyes. The proposed projector is designed for projecting a single-eye image, using any one of two display systems of the HMD together with the above-mentioned modifications: light-source changing mechanism, optical-correcting-portion inserting mechanism, converting mechanism for converting the enlarging optical device to the projector optical device.

It is also possible to provide two display systems of the HMD with the above-mentioned modifications, i.e., a pair of light-source changing mechanisms, optical-correcting-portion inserting mechanisms, converting mechanisms for converting the enlarging optical devices to the projector optical devices. This embodiment projector can display a three-dimensional image by projecting two images for both eyes onto the screen. This projector according to another one of the present invention can be thus realized.

The three-dimensional image projector according to the present invention is described further in detail as follows:

Referring to FIG. 20, a difference of convergence angles of three-dimensional images displayed by a head-mounted display (HMD) and a three-dimensional image projector is explained.

Figure 20A:
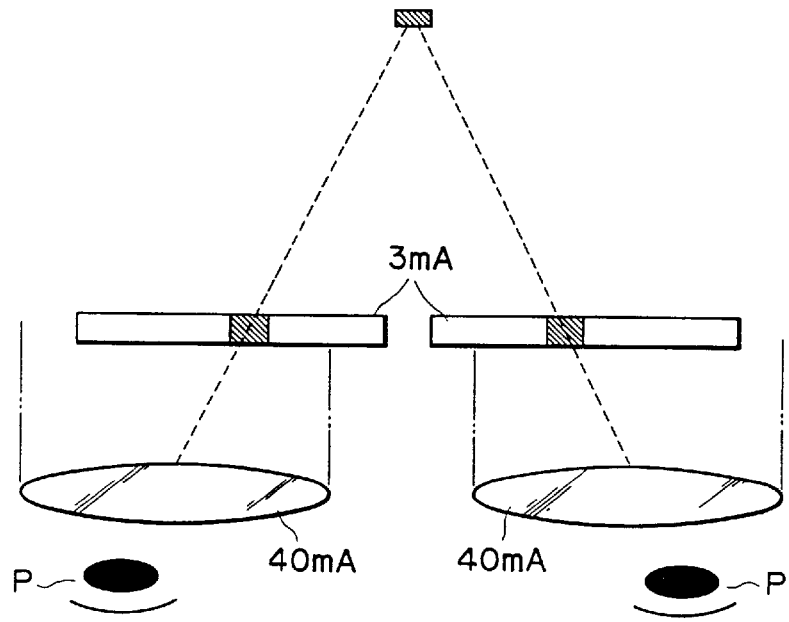
FIG. 20A is a view for explaining a difference of convergence angles when displaying a stereo-image by a head-mounted display.

The convergence angle is an angle made by an intersection of two visual lines (of left eye and right eye) necessary for perceptively recognizing two images (for left eye and right eye) as an image. FIG. 20A shows the convergence angle when using the HMD, indicating that paired liquid-crystal panels 3mA must be near to each other in comparison with paired lenses 40mA.

Figure 20B:
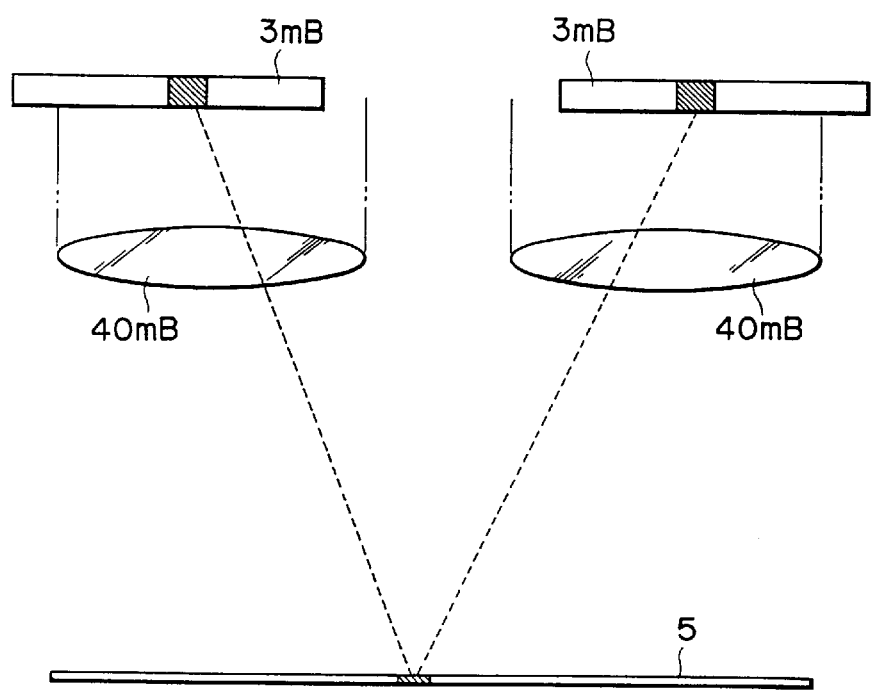
FIG. 20B is a view for explaining the convergence angle when displaying a stereo-image by a projector.

FIG. 20B shows the convergence angle when using the projector, indicating that paired liquid-crystal panels 3mA must be apart from each other in comparison with paired lenses 40mA. This is realized by electrically displacing image display positions of liquid crystal panels 3mA and 3mB. In practice, this is realized by delaying horizontal synchronizing signals of image signals to be inputted to the liquid crystal panels 3mA and 3mB respectively.

The convergence control can be automatically conducted by electrically connecting the convergence changing portion when the HMD is connected to the base unit described in the foregoing embodiment.

Figure 21:
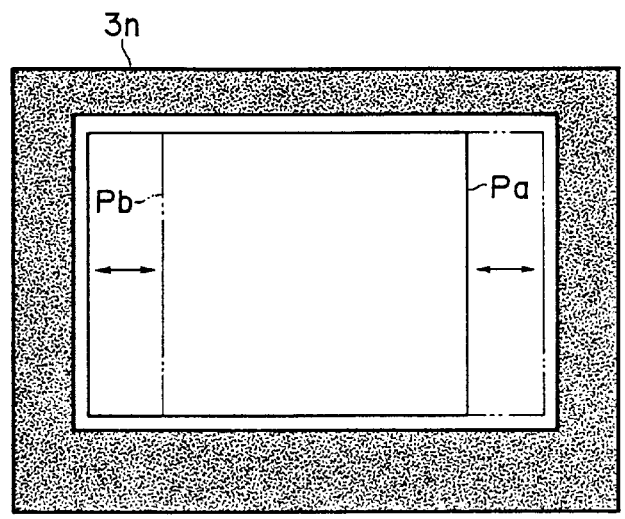
FIG. 21 is a view for explaining an exemplified action of a convergence changing portion by moving a liquid crystal panel.

The convergence control can be also executed by mechanically displacing the liquid crystal panels 3mA and 3mB or the optical devices. FIG. 21 illustrates the case of displacing the image display device. In FIG. 21, the image display position of a liquid crystal panel 3n can be adjusted within frames Pa and Pb.

Figure 22:
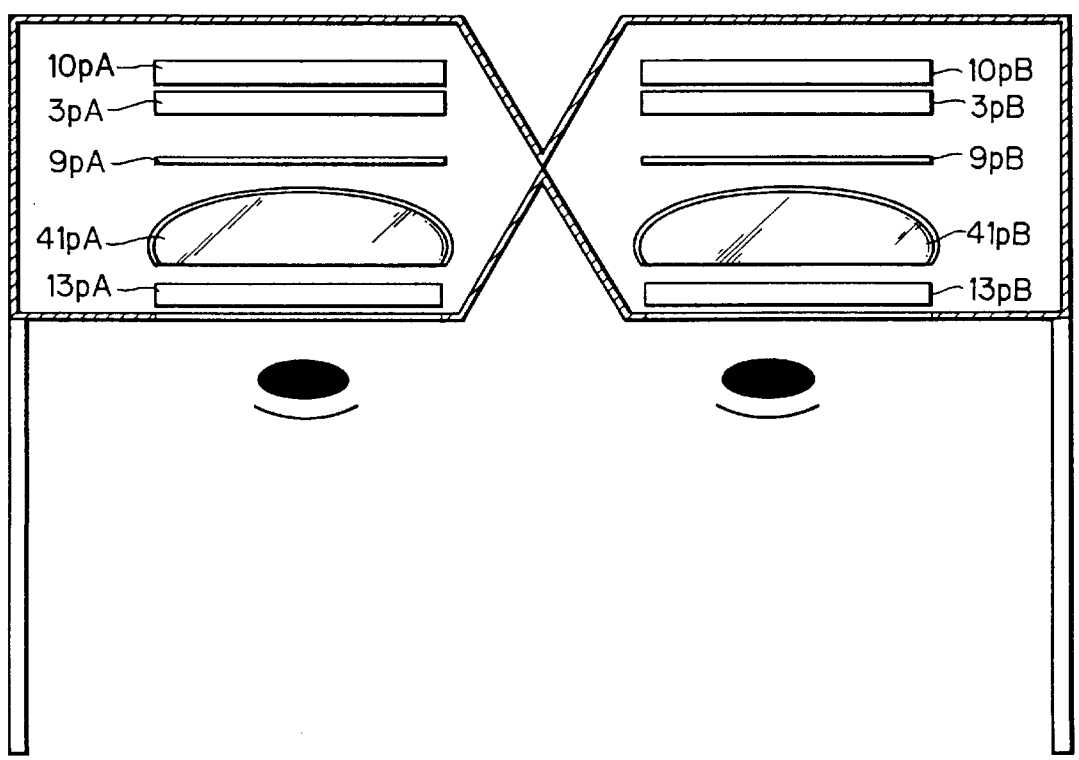
FIG. 22 is a construction view of a head-mounted display used in a projector device capable of displaying a three-dimensional image according to the present invention.
Figure 23A:
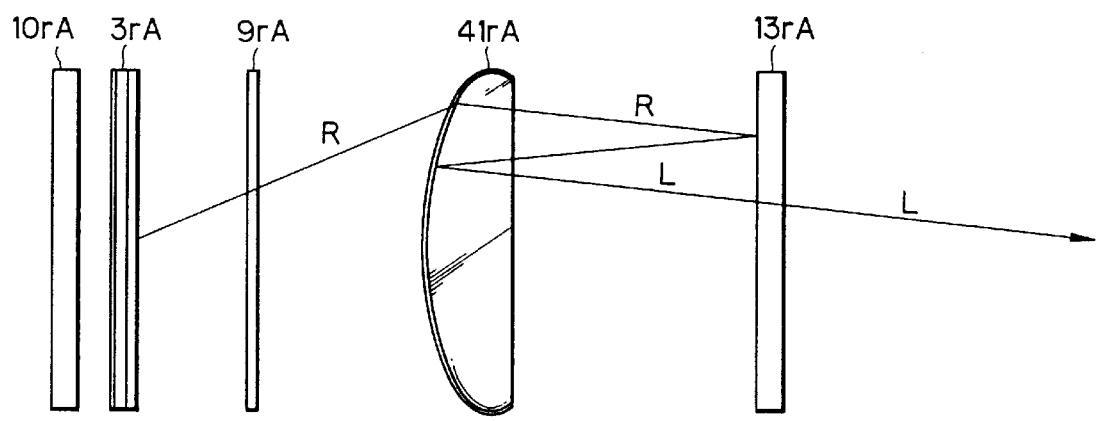
FIG. 23A is a construction view of an optical system for left eye used in a projector device capable of displaying a three-dimensional image according to the present invention.
Figure 23B:
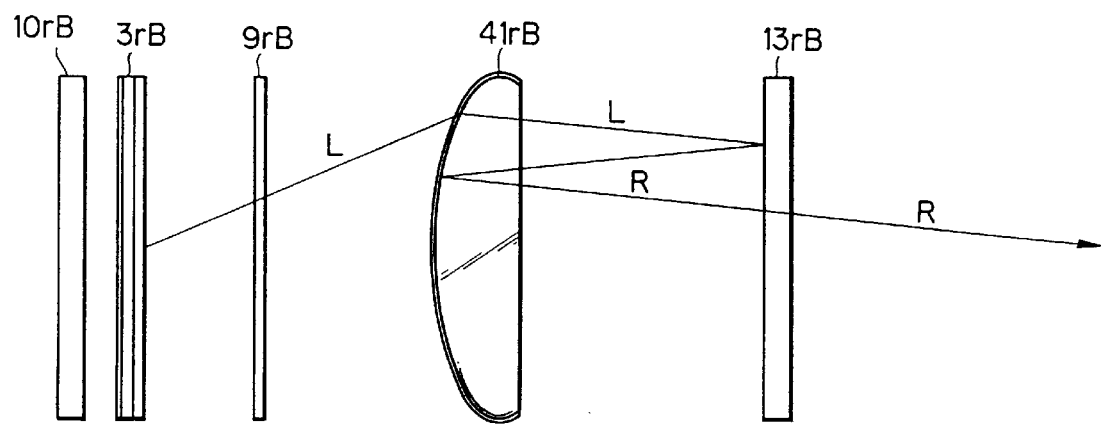
FIG. 23B is a construction view of an optical system for right eye used in a projector device capable of displaying a three-dimensional image according to the present invention.

FIG. 22 is construction view of a head-mounted display (HMD) used in a projector device capable of displaying a three-dimensional image according to the present invention. FIG. 23A or 23B shows each display device portion of the HMD of FIG. 22: FIG. 23A shows the construction of the device for the left eye and FIG. 23B shows the construction of the device for the right eye. The construction and the operation of each device are described below.

In FIG. 23A, there is shown a display system for the left eye, which comprises a back light 10rA, a liquid crystal panel 3rA, a quarter-wave plate 9rA disposed at 45° with input light axis for converting linearly polarized light from the liquid crystal panel 3rA to clockwise-circularlypolarized light, a plano-convex lens 41rA with a half-mirror coat applied to the convex surface thereof and a cholesteric liquid crystal 13rA whose molecules are so aligned that they can totally reflect clockwise-circularly-polarized light and totally transmit counterclockwise-circulaly-polarized light.

In FIG. 23B, there is shown a display system for the right eye, which comprises a back light 10rB, a liquid crystal panel 3rB, a quarter-wave plate 9rB disposed at −45° with input light axis for converting linearly polarized light from the liquid crystal panel 3rB to counter clockwise-circularly-polarized light, a plano-convex lens 41rB with a half-mirror coat applied to the convex surface thereof and a cholesteric liquid crystal 13rB whose molecules are so aligned that they can totally reflect counter clockwise-circularly-polarized light and totally transmit clockwise-circulaly-polarized light.

Light from the optical system of FIG. 23A and light from the optical system of FIG. 23B are polarized in different directions. Namely, the optical system for the left eye (FIG. 23A) emits counterclockwise-polarized light while the optical system for the right eye (FIG. 23B) emits clockwise polarized light. In this embodiment, cholesteric liquid crystal devices are used as circularly-polarized-light selecting semitransparent mirrors. It is also possible to use circularly-polarized-light selecting semi-transparent mirrors each consisting of a quarter-wave plate, a half-mirror and polarizer as used in the foregoing embodiment.

Figure 24:
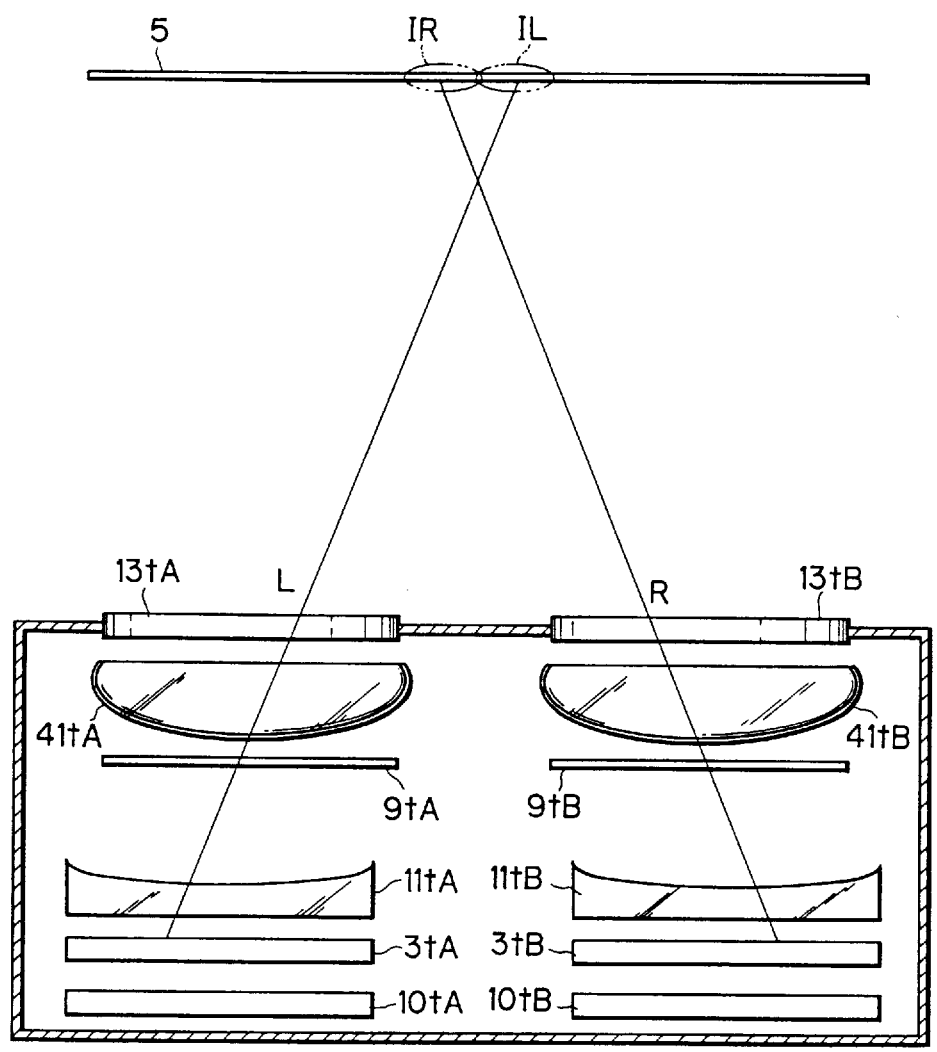
FIG. 24 is illustrative of a projector device capable of displaying a three-dimensional image according to the present invention.

The HMD is assembled with a projector device according to the present invention to project both images for the left eye and the right eye onto a screen as shown in FIG. 24. In FIG. 24, paired optical correcting portions 11tA and 11tB are inserted when the HMD was connected with the projector device, paired projector light-sources 11tA and 11tB by which the HMD light-sources are changed when the HMD was connected to the projector device, a screen 5, an image IL for the left eye and an image IR for the right eye.

Figure 25:
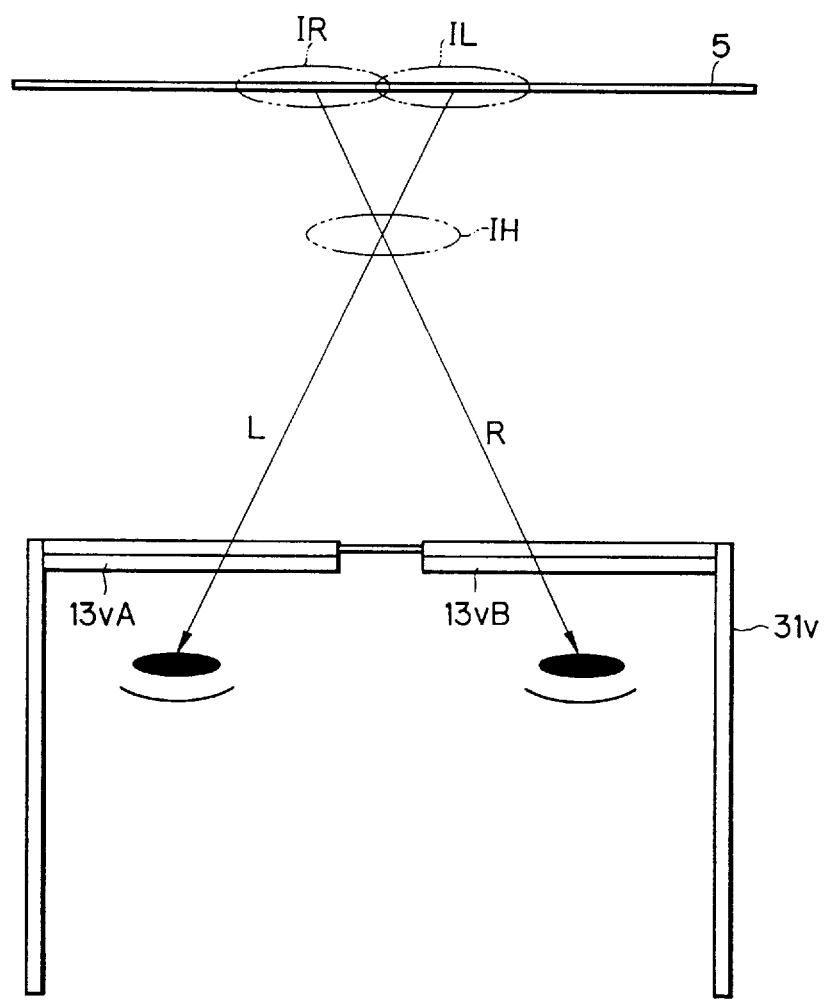
FIG. 25 is a view for explaining a method of using a projector device capable of displaying a three-dimensional image according to the present invention.

A user views the screen image through spectacles shown in FIG. 25. In FIG. 25, numerals 13vA, 13vB designate circularly-polarized-light selecting plates and numeral 31v designates a frame of the spectacles.

Each circularly-polarized-light selecting plate is an optical part composed of a quarter-wave plate and a polarizer, which transmission and absorption characteristics vary depending upon the polarized direction of the incident light. Namely, the part 13vA absorbs counterclockwise circularly polarized light and transmits clockwise circularly polarized light whereas the part 13vB absorbs clockwise circularly polarized light and transmits counterclockwise circularly polarized light.

When a user views an image on the screen 5 through the above-mentioned spectacles, he or she can see an image IR by the right eye and an image IL by the left eye, thus enjoying a stereo-image IH.

The three-dimensional image projector for use with the HMD according to another one of the present invention is thus realized.

According to the present invention, it is possible to provide:

(1) a small and light liquid-crystal projector which has a projecting optical device composed of a reflection type refracting element with a half-mirror coat and a circularly-polarized-light selecting semitransparent mirror to cause incident light to make a round and a half trip between the reflection type refracting element and the circularly polarized light selecting semitransparent mirror, thus increasing the optical power and saving in size of the optical system, and which is also provided with optical correcting means for optically correcting distortion of a projectable image for curvature of the image surface, thus realizing representation of a distortion-free image on a screen;

(2) a small and light liquid-crystal projector which can be used as a separate head-mounted display (HMD) as well as be used as a projector device for projecting an image from the HMD to a screen to allow a plural persons can enjoy said HMD at a time, and which uses a small and light type enlarging optical system as a projecting optical system, thus realizing reduction in size and weight of the projector device;

(3) a small and light liquid-crystal projector which has a separately usable head-mounted display (HMD) having two display systems for left and right eyes and being capable of representing a three-dimensional image and which can also project the three-dimensional image from the HMD to a commonly viewable screen by using the HMD together with a pair of projector devices described in item (2) and with a pair of convergence control portions;

(4) a small and light liquid-crystal projector which uses the circularly polarized light selecting semitransparent mirror composed of a half-mirror quarter-wave plate, a half-mirror and a polarizer, which components may be thin existing parts, thus easily realizing the effects of embodiments described in items (1) to (3); and (5) a small and light liquid-crystal projector that has advantages described in items (1) to (3) and further featured in that the circularly-polarized-light selecting semitransparent mirror is made of cholesteric liquid crystal, which has higher brightness than the optical system of the embodiment of item (4).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A small-size liquid-crystal projector comprising:

a liquid-crystal display;

a back-light for illuminating the liquid-crystal display;

a projecting optical device including a refracting element having a half-mirror coat on a curved surface thereof, a circularly polarized light selecting semitransparent mirror and a quarter-wave plate interposed between the liquid-crystal display and the circularly polarized light selecting semitransparent mirror, which components are disposed in turn from the liquid-crystal display side; and optical correcting means for optically correcting distortion of a projectable image.

2. A small-size liquid-crystal projector which comprises a head-mounted display (hereinafter abbreviated as HMD), said HMD comprising a liquid-crystal display, a back-light for directly viewing the liquid-crystal display, a refracting element having a half-mirror coat on a curved surface thereof, a circularly polarized light selecting semitransparent mirror, a quarter-wave plate interposed between the liquid-crystal display and the circularly polarized light selecting semitransparent mirror, which components are disposed in turn from the liquid-crystal display side, and a base unit that is usable in combination with the HMD and includes a projection back-light, back-light selecting means for switching from the liquid-crystal back-light to the projector back-light and vice versa, and optical correcting means insertable in an optical path of the HMD for optically correcting distortion of a projectable image.

3. A small-size liquid-crystal projector as defined in claim 2, wherein two sets of unit combination of the HMD and the base unit are paired and convergence control means for changing relative positions of the liquid-crystal display and the optical system including the refracting element having the half-mirror coat and the circularly polarized light selecting semi-transparent mirror is also provided to enable representing three-dimensional image.

4. A small-size liquid-crystal projector as defined in any one of claims 1 to 3, wherein the circularly polarized light selecting semi-transparent mirror comprises components disposed in turn from the liquid-crystal display side, which are a second quarter-wave plate, a half-mirror and a polarizer.

5. A small-size liquid-crystal projector as defined in any one of claims 1 to 3, wherein the circularly polarized light selecting semitransparent mirror is made of a cholesteric liquid crystal.

\* \* \* \* \*